(12) United States Patent
Assmann et al.

(10) Patent No.: US 11,029,153 B2
(45) Date of Patent: Jun. 8, 2021

(54) LENGTH MEASUREMENT ON AN OBJECT BY TAKING BEARINGS ON MEASURING POINTS BY MEANS OF A LASER MEASURING MODULE

(71) Applicant: Robert Bosch GmbH, Stuttgart (DE)

(72) Inventors: Steffen Assmann, Leinfelden-Echterdingen (DE); Stoyan Todorov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/742,640

(22) PCT Filed: Jun. 8, 2016

(86) PCT No.: PCT/EP2016/062937
§ 371 (c)(1),
(2) Date: Jan. 8, 2018

(87) PCT Pub. No.: WO2017/005439
PCT Pub. Date: Jan. 12, 2017

(65) Prior Publication Data
US 2018/0202806 A1    Jul. 19, 2018

(30) Foreign Application Priority Data

Jul. 8, 2015   (DE) ..................... 10 2015 212 752.4
Jul. 27, 2015  (DE) ..................... 10 2015 214 148.9

(51) Int. Cl.
*H04N 7/18*  (2006.01)
*G01C 15/00* (2006.01)
*G01C 3/08*  (2006.01)
(Continued)

(52) U.S. Cl.
CPC ............ *G01C 15/002* (2013.01); *G01B 11/03* (2013.01); *G01C 3/08* (2013.01); *G08C 17/02* (2013.01)

(58) Field of Classification Search
CPC ........ G01C 15/002; G01C 3/08; G01B 11/03; G08C 17/02; H04N 7/18
(Continued)

(56) References Cited

U.S. PATENT DOCUMENTS 7,981,462 B2 * 7/2011 Bustgens ................ B05B 12/04
                                                    118/323
2002/0059042 A1 * 5/2002 Kacyra ................ G01B 11/002
                                                    702/152
(Continued)

FOREIGN PATENT DOCUMENTS

CN      1761855 A      4/2006
CN      1849530 A     10/2006
(Continued)

OTHER PUBLICATIONS

International Search Report corresponding to PCT Application No. PCT/EP2016/062937, dated Sep. 12, 2016 (German and English language document) (7 pages).

*Primary Examiner* — Michael Lee
(74) *Attorney, Agent, or Firm* — Maginot, Moore & Beck LLP

(57) ABSTRACT

A system includes a laser measuring module. The laser measuring module is configured to provide a length measurement. The system further includes at least one display module. The display module is configured to electronically display at least one measuring point. The display module is further configured to be separate or removable from the laser measuring module. The bearings of the at least one measuring point are taken using the laser measuring module.

19 Claims, 2 Drawing Sheets

(51) Int. Cl.
*G01B 11/03* (2006.01)
*G08C 17/02* (2006.01)

(58) Field of Classification Search
USPC .......................................................... 348/143
See application file for complete search history.

(56) References Cited

U.S. PATENT DOCUMENTS

| | | | | |
|---|---|---|---|---|
| 2007/0121096 | A1* | 5/2007 | Giger | G01S 7/003 |
| | | | | 356/5.02 |
| 2008/0123903 | A1* | 5/2008 | Matsuo | G01C 1/04 |
| | | | | 382/106 |
| 2009/0222237 | A1* | 9/2009 | Otani | G01C 1/04 |
| | | | | 702/152 |
| 2013/0108116 | A1* | 5/2013 | Suzuki | G01B 11/002 |
| | | | | 382/106 |
| 2013/0278752 | A1* | 10/2013 | Schorr | G01C 11/00 |
| | | | | 348/95 |
| 2014/0320603 | A1* | 10/2014 | Pettersson | G01C 15/002 |
| | | | | 348/46 |
| 2015/0160000 | A1* | 6/2015 | Hayes | G01C 15/002 |
| | | | | 702/155 |
| 2016/0224927 | A1* | 8/2016 | Pettersson | G06Q 50/08 |

FOREIGN PATENT DOCUMENTS

| | | |
|---|---|---|
| CN | 102200445 A | 9/2011 |
| CN | 103827631 A | 5/2014 |
| CN | 104508425 A | 4/2015 |
| EP | 1 293 755 A1 | 3/2003 |
| EP | 1 460 377 A2 | 9/2004 |
| EP | 2 698 600 A1 | 2/2014 |
| EP | 2 698 602 A1 | 2/2014 |
| EP | 3 021 078 A1 | 5/2016 |
| WO | 2012/034813 A1 | 3/2012 |
| WO | 2013/007917 A1 | 1/2013 |
| WO | 2013/020845 A1 | 2/2013 |
| WO | 2013/045517 A1 | 4/2013 |

\* cited by examiner

LENGTH MEASUREMENT ON AN OBJECT BY TAKING BEARINGS ON MEASURING POINTS BY MEANS OF A LASER MEASURING MODULE

This application is a 35 U.S.C. § 371 National Stage Application of PCT/EP2016/062937, filed on Jun. 8, 2016, which claims the benefit of priority to Serial No. DE 10 2015 212 752.4, filed on Jul. 8, 2015 in Germany and to Serial No. DE 10 2015 214 148.9, filed on Jul. 27, 2015 in Germany, the disclosures of which are incorporated herein by reference in their entirety.

BACKGROUND

A system having a laser measuring module, which is provided for a length measurement, and having at least one display module, which is at least provided for the purpose of electronically displaying at least one measuring point, the bearings of which have been taken by means of the laser measuring module, has already been proposed.

SUMMARY

The disclosure is based on a system having a laser measuring module, which is provided for a length measurement, and having at least one display module, which is at least provided for the purpose of electronically displaying at least one measuring point, the bearings of which have been taken by means of the laser measuring module.

It is proposed that the display module is configured to be separate from or removable from the laser measuring module.

As a result, a user can identify the position of a measuring point on a measuring object in a particularly simple manner. It is possible to avoid shifting a gaze between different displays. A particularly efficient measuring operation can be achieved. Laser radiation which is dangerous for a human eye can be avoided. A particularly safe system can be provided. A particularly cost-effective system can be provided. In this context, a "laser measuring module" is intended to be understood as meaning a module which comprises at least one laser measuring device, preferably a handheld laser measuring device, for a length measurement by means of at least one laser beam. The laser preferably has a frequency outside a visible spectrum. Alternatively, the laser may have a frequency inside a visible spectrum. The laser measuring device is provided for the purpose of being moved, in particular pivoted, in space in order to change an emission direction of the laser beam. It is also conceivable for the laser measuring device to comprise at least one beam deflection means which is provided for the purpose of changing the emission direction of the laser beam. In this context, "electronically" display is intended, in particular, by means of an electronic imaging and/or image-generating method, for example by means of a tube, TFT, LCD, LED screen or another electronic screen which appears to be suitable to a person skilled in the art and/or by means of a tube, TFT, LCD, LED projector or another electronic projector which appears to be suitable to a person skilled in the art. The output module preferably displays an image of the measuring point in a field of view of a user and/or in an environmental display. In this context, "configured to be separate" or "removable" is intended to be understood as meaning, in particular, the fact that the laser measuring module and the display module, in particular, are spatially at a distance and/or can be operated without a fixed mechanical connection to one another. The laser measuring module and the display module preferably each have a housing or a frame unit, the housing or the frame unit of the laser measuring module being configured to be separate from the housing or the frame unit of the display module. The display module is provided for the purpose of being moved, that is to say spatially displaced and/or rotated, independently of the laser measuring module at least in one spatial region. The display module preferably has at least one fastening means which is provided for the purpose of fixing the display module to a human body, in particular a head. Alternatively, the display module may be in the form of a handheld display module and may have at least one handle and/or at least one gripping surface. "Provided" is intended to be understood as meaning, in particular, specifically programmed, designed and/or equipped. The fact that an object is provided for a particular function is intended to be understood as meaning, in particular, the fact that the object performs and/or carries out this particular function in at least one application and/or operating state.

In one advantageous configuration, the system has at least one communication apparatus which is provided for the purpose of transmitting at least position data relating to the measuring point, the bearings of which have been taken, from the laser measuring module to the display module. This makes it possible to provide a system which can be used in a particularly versatile manner. A position of the measuring point, the bearings of which have been taken, can be identified without a time loss. In this context, a "communication apparatus" is intended to be understood as meaning, in particular, an electronic data transmission apparatus. The communication apparatus is preferably provided for wireless, in particular radio-based, data transmission and/or has at least one radio data interface. Alternatively or additionally, the communication apparatus may be provided for wired data transmission. It is conceivable for the laser measuring module and the display module to be connected to one another by means of a flexible cable, in particular for energy transmission and/or data transmission. In this context, "position data" are intended to be understood as meaning, in particular, data for localization in a reference system, for example coordinates in a coordinate system. The position data are preferably in the form of coordinates in a coordinate system of the laser measuring module or in a coordinate system of a laser measuring device of the laser measuring module. Alternatively, the position data may be in the form of coordinates of a coordinate system of the display module. It is also conceivable for the position data to be in the form of coordinates of a stationary coordinate system or of another coordinate system which appears to be useful to a person skilled in the art, for example in the form of coordinates of a positioning system, in particular a radio-based positioning system. In this context, "stationary" is intended to be understood as meaning, in particular, fixed with respect to the measuring object and/or with respect to the earth's surface. The communication apparatus preferably transmits the position data regularly, in particular periodically, and/or in real time in an operating state. In this context, "regularly" is intended, in particular, repeatedly in an interval of time of at most 0.5 s, preferably of at most 0.1 s, preferably of at most 0.02 s and particularly preferably of at most 0.01 s. In this context, "in real time" is intended to be understood as meaning, in particular, apparently without delay for a user. A delay between a change in the position data and a transmission is preferably less than 0.5 s, preferably less than 0.1 s, preferably less than 0.02 s and particularly preferably less than 0.01 s.

It is also proposed that the display module has at least one capture unit for capturing environmental data. As a result, different reference systems for the position data relating to the at least one measuring point can be adjusted in a particularly accurate manner. As a result, position data for displaying the at least one measuring point can be referenced in a particularly accurate manner. Redundant data may be provided for adjusting reference systems and errors can be detected and/or avoided during an adjustment. In this context, a "capture unit" is intended to be understood as meaning, in particular, a unit for capturing by means of waves, in particular by means of sound waves and/or by means of electromagnetic waves. The capture unit preferably has at least one camera for capturing image data. The laser measuring module preferably has a capture unit for capturing environmental data. The laser measuring module preferably has at least one capture unit, for example a camera, for capturing environmental data. The laser measuring module and the display module preferably each have at least one capture unit. The capture unit of the display module is preferably provided for the purpose of capturing environmental data for comparison with environmental data from another source, in particular for comparison with environmental data which are provided by the capture unit of the laser measuring module.

In one advantageous configuration, the display module comprises a location capture unit. This makes it possible to reliably determine a location of the display module relative to a location of the laser measuring module and/or relative to a stationary reference system. In this context, a "location capture unit" is intended to be understood as meaning, in particular, a unit for capturing a position and/or an orientation of an object, in particular relative to a position and/or orientation in the past, and/or relative to a reference system. The location capture unit preferably comprises at least one inertial sensor, a compass, and/or a receiving means for a positioning system, in particular for a radio-based positioning system. The laser measuring module preferably has at least one location capture unit. The laser measuring module and the display module preferably each have at least one location capture unit.

In one advantageous configuration, the system comprises a computing unit which is provided for the purpose of determining coordinates for displaying the measuring point at least from position data relating to the measuring point, the bearings of which have been taken, and from location data relating to the display module. This makes it possible to provide a particularly powerful system. A simple measuring operation can be achieved. A high degree of user comfort can be achieved. A probability of operating errors can be reduced. A "computing unit" is intended to be understood as meaning, in particular, a unit having information input, information processing and information output. The computing unit advantageously has at least one processor, a memory, input and output means, further electrical components, an operating program, regulating routines, control routines and/or calculation routines. In this context, "location data" are intended to be understood as meaning, in particular, position data and/or orientation data. The location data are preferably stated as coordinates in a coordinate system. The computing unit is preferably provided for the purpose of determining coordinates for displaying the measuring point at least from position data relating to the measuring point, the bearings of which have been taken, and/or from location data relating to the laser measuring module and/or from location data relating to the display module. In particular, the computing unit is provided for the purpose of transforming the coordinates of the measuring point, in particular from a coordinate system of the laser measuring module into a coordinate system of the display module. In particular, the computing unit is provided for the purpose of converting coordinates of the position data in a source coordinate system into coordinates of the position data in a target coordinate system. In particular, the computing unit is provided for the purpose of displaying and/or recording and/or playing back a true and/or apparent movement of an image of the measuring point displayed by means of the display module, for example on account of a movement of the display module. The computing unit is preferably configured as part of the display module. Alternatively, the computing unit may be configured as part of the laser measuring module.

A laser measuring module of the system according to the disclosure is also proposed. This makes it possible to provide a laser measuring module which can be used in a particularly versatile and/or convenient manner.

A display module of the system according to the disclosure is also proposed. This makes it possible to provide a particularly user-friendly display module.

A method for displaying a measuring point by means of the system according to the disclosure is also proposed, in which location data relating to the display module are compared with location data relating to the laser measuring module. As a result, location data can be advantageously related to one another and/or compared. This makes it possible to easily limit errors during display by means of the display module. A position of a measuring point can be displayed in a particularly easily discernible manner for a user even in the case of unfavorable conditions and/or over a great distance. In this context, "compare" is intended to be understood as meaning, in particular, the fact that at least one reference point and/or at least one reference direction of the location data is/are matched to one another, in particular aligned with one another. At least four reference points and/or at least three reference directions, in particular three orthogonal reference directions, are preferably matched to one another. It is conceivable for the laser measuring module and the display module to be mechanically connected to one another in a releasable manner by means of a coupling unit of the system for the purpose of the comparison. During the comparison, at least one location capture unit of the display module is preferably adjusted to at least one location capture unit of the laser measuring module or vice versa. It is also conceivable for a location capture unit of the laser measuring module and/or a location capture unit of the display module to be adjusted to a stationary reference system and/or to a reference system of a positioning system. It is also conceivable for the location data relating to the display module to be compared with location data relating to the laser measuring module using environmental data, in particular camera data.

In one advantageous configuration, the display module is moved independently of the laser measuring module in space and a location capture unit of the display module captures location data relating to the display module at least in one method step. As a result, a user can continuously track a position of the measuring point. A particularly efficient method for determining and/or checking a position of a measuring point can be achieved. The location capture unit of the display module preferably captures location data relating to the display module regularly, in particular periodically, and/or in real time.

It is also proposed that a computing unit of the system determines display coordinates of the measuring point, the bearings of which have been taken, for displaying the measuring point at least from the location data relating to the laser measuring module and from the location data relating to the display module in at least one method step. As a result, a user can capture a position of a measuring point in a particularly simple manner. The computing unit preferably determines the display coordinates by means of a trigonometric transformation rule for converting the position data from a coordinate system of the laser module into a coordinate system of the display unit. Alternatively, the computing unit can determine the display coordinates of the measuring point, the bearings of which have been taken, from position data relating to the measuring point based on a stationary coordinate system, from the location data relating to the laser measuring module and from location data relating to the display module which are based on a location of the laser measuring module or on the stationary coordinate system.

In an advantageous manner, the bearings of at least one further measuring point are taken by means of the laser measuring module and the display module displays the at least one further measuring point at least in one method step. This makes it possible to achieve a particularly simple and user-friendly method for complex measuring operations, for example for indirect measurements. The display module preferably displays the measuring point and the at least one further measuring point at the same time.

It is also proposed that the display module displays a line between the measuring point and the at least one further measuring point at least in one method step. This makes it possible to achieve a particularly clear method for a measuring operation, in particular for indirect measurements. It is possible to provide a method for measuring sections which are difficult to access, for example in buildings. In this context, a "line" is intended to be understood as meaning, in particular, a straight connecting section between the measuring points.

In one advantageous configuration, bearings of a sequence of at least three measuring points are taken by means of the laser measuring module and the display module displays the measuring points for selection for a measuring operation at least in one method step. This makes it possible to provide a method for measuring complex figures. It is conceivable for a user to construct a geometrical figure, for example a traverse, a circle, a cuboid, a sphere, a cylinder or another figure which appears to be suitable to a person skilled in the art, using the computing unit on the basis of the sequence of points in an operating mode of the system. It is also conceivable for the display module to display the figure, for example in the form of a grid.

It is also proposed that a computing unit of the system calculates at least one geometrical variable determined by the measuring points. This makes it possible to achieve a particularly powerful method. A short amount of time for a measuring operation can be achieved. In this context, a "geometrical variable" is intended to be understood as meaning, in particular, a sum of distances, a surface area, a volume, an angle and/or an angle sum. It is conceivable for the geometrical variable to be based on a figure constructed by a user by means of the computing unit and displayed by the display unit.

The system according to the disclosure, the laser measuring module, the display module and/or the method is/are not intended to be restricted here to the use and embodiment described above. In particular, the system according to the disclosure, the laser measuring module and/or the display module may have a number of individual elements, components and units which differs from a number mentioned herein in order to perform a method of operation described herein.

BRIEF DESCRIPTION OF THE DRAWINGS

Further advantages emerge from the following description of the drawing. The drawing illustrates an exemplary embodiment of the disclosure. The drawing, the description and the claims contain numerous features in combination. A person skilled in the art will also expediently consider the features individually and will combine them to form useful further combinations.

In the drawing.

DETAILED DESCRIPTION

Figure 1:
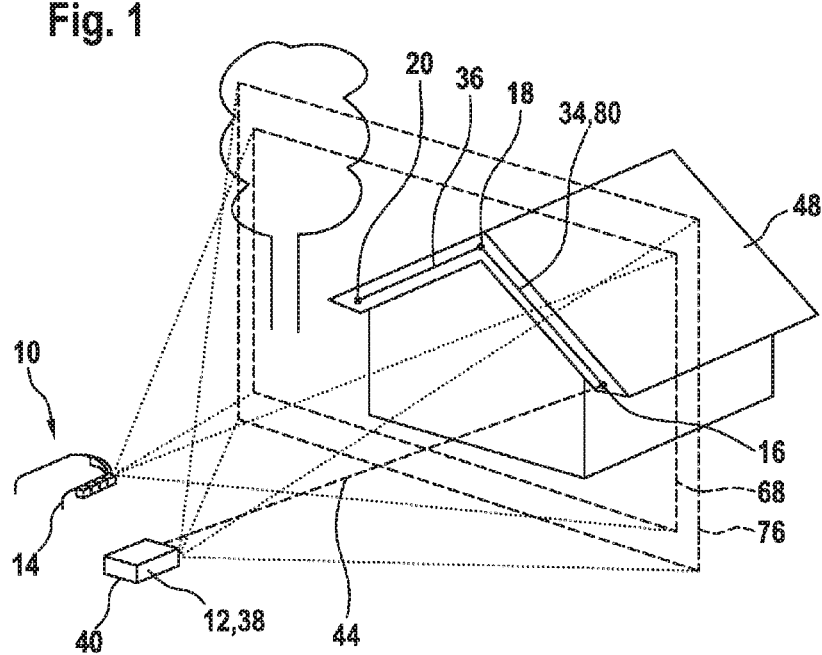
FIG. 1 shows a schematic overview of a system according to the disclosure having a laser measuring module and a display module.
Figure 2:
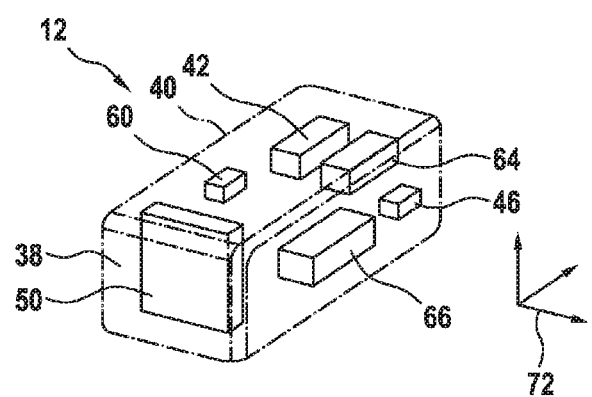
FIG. 2 shows a schematic illustration of the laser measuring module.

FIG. 1 shows a system 10 having a laser measuring module 12, which is provided for a length measurement, and having a display module 14, which is provided for the purpose of electronically displaying a measuring point 16, the bearings of which have been taken by means of the laser measuring module 12. The laser measuring module 12 comprises a laser measuring device 38 having a housing 40. The laser measuring device 38 comprises a beam unit 42 which is provided for the purpose of emitting a laser measuring beam 44 for a distance measurement. The laser measuring device 38 comprises a sensor unit 46 which is provided for the purpose of capturing a reflection of the laser measuring beam 44 at a measuring object 48. In the present exemplary embodiment, the beam unit 42 is provided for the purpose of emitting the laser measuring beam 44 with a frequency outside a visible spectrum (cf. FIG. 2). The sensor unit 46 is provided for the purpose of capturing the reflection outside the visible spectrum. The laser measuring device 38 comprises a control and regulating unit 50 which is provided for the purpose of evaluating a signal from the sensor unit 46 and determining a distance to the measuring object 48. The control and/or regulating unit 50 is provided for the purpose of evaluating a phase angle of a reflected light portion in comparison with a phase angle of the emitted laser measuring beam 44 and/or a propagation time of the light of the emitted laser measuring beam 44 to the remote measuring object 48, at which the laser measuring beam 44 is at least partially reflected, and back to the laser measuring device 38.

Figure 3:
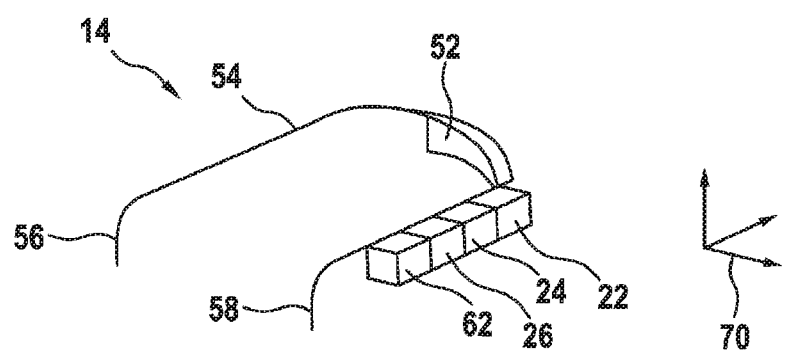
FIG. 3 shows a schematic illustration of the display module.

The display module 14 is configured to be separate from the laser measuring module 12. The display module 14 is configured to be separate from the laser measuring device 38 of the laser measuring module 12. The display module 14 is provided for the purpose of assisting a user in a measuring operation, for example when determining distances to be measured. The display module 14 is provided for the purpose of being moved independently of the laser measuring module 12 in space. The display module 14 is provided for the purpose of being moved independently of the laser measuring device 38 of the laser measuring module 12 in space. The display module 14 is provided for the purpose of making a position of the measuring point 16 visible to the user. In the present exemplary embodiment, the display module 14 is in the form of glasses and comprises a display unit 52 and a frame unit 54 (cf. FIG. 3). The display unit 52 is provided for the purpose of being worn by the user on his head. The display unit 52 has fastening means 56, 58 which are provided for the purpose of fastening the display module 14 to a human body. The fastening means 56, 58 are in the form of ear hooks in the present exemplary embodiment.

The system 10 comprises a communication apparatus which is provided for the purpose of transmitting position data relating to the measuring point 16, the bearings of which have been taken, from the laser measuring module 12 to the display module 14. In the present exemplary embodiment, the communication apparatus is provided for wireless data transmission. The communication apparatus comprises a transmitting unit 60 arranged in the housing 40 of the laser measuring device 38 and a receiving unit 62 arranged on the display module 14. The communication apparatus is provided for radio transmission of data. The communication apparatus has standardized interfaces. In the present exemplary embodiment, the communication apparatus has a Bluetooth interface and/or a Wi-Fi interface. The communication apparatus is provided for the purpose of regularly transmitting the position data relating to the measuring point 16 in an operating state. The communication apparatus is provided for the purpose of transmitting the position data relating to the measuring point 16 in real time in an operating state.

The laser measuring module 12 has a capture unit 64 for capturing environmental data. In the present exemplary embodiment, the capture unit 64 of the laser measuring module 12 is in the form of a camera. The display module 14 has a capture unit 22 for capturing environmental data. In the present exemplary embodiment, the capture unit 22 of the display module 14 is in the form of a camera. The capture unit 64 of the laser measuring module 12 and the capture unit 22 of the display module 14 are provided for the purpose of capturing environmental data which can be compared with one another. The communication apparatus is provided for the purpose of transmitting environmental data captured by the capture unit 64 of the laser measuring module 12 and/or environmental data captured by the capture unit 22 of the display module 14.

The display module 14 comprises a location capture unit 24. In the present exemplary embodiment, the location capture unit 24 is provided for the purpose of capturing a location change of the display module 14. The location capture unit 24 comprises a plurality of inertial sensors and a compass. The location capture unit 24 is provided for the purpose of evaluating signals from the inertial sensors relating to a movement, in particular an acceleration, and/or a rotation, in particular a rotational acceleration, of the display module 14 based on a starting location. The laser measuring module 12 comprises a location capture unit 66. In the present exemplary embodiment, the location capture unit 66 of the laser measuring module 12 is provided for the purpose of capturing a location change of the laser measuring module 12. The location capture unit 66 is provided for the purpose of capturing a movement and/or a rotation of the laser measuring module 12 based on a starting location.

The system 10 comprises a computing unit 26 which is provided for the purpose of determining coordinates for displaying the measuring point 16 from position data relating to the measuring point 16, the bearings of which have been taken, in particular from a distance to the laser measuring module 12 and/or from coordinates based on a coordinate system 72 of the laser measuring module 12 and/or based on a stationary coordinate system, and from location data relating to the display module 14, in particular from a position and/or orientation of the display module 14 based on the coordinate system 72 of the laser measuring module 12 and/or based on the stationary coordinate system. In the present exemplary embodiment, the computing unit 26 is part of the display module 14. The computing unit 26 is connected to the capture unit 22 using signaling. The computing unit 26 is connected to the location capture unit 24 of the display module 14 using signaling. The computing unit 26 is connected to the receiving unit 62 of the communication apparatus using signaling. The computing unit 26 is connected to the display unit 52 using signaling. In the present exemplary embodiment, the display unit 52 of the display module 14 is provided for the purpose of electronically displaying an image of the measuring point 16 in a field of view 68 of the user. The coordinates of the image are dependent on a position and an orientation of the display module 14. The coordinates are a function of the position and orientation of the display module 14.

Figure 4:
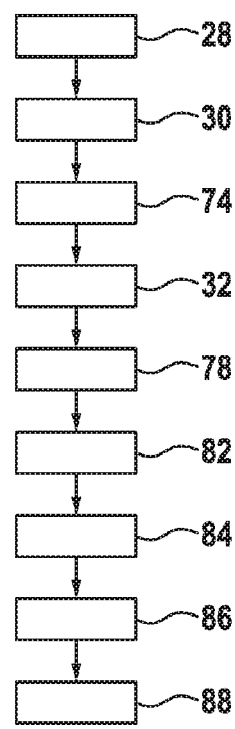
FIG. 4 shows a flowchart for a measuring method by means of the system.

In a method for displaying the measuring point 16, location data relating to the display module 14 are compared with location data relating to the laser measuring module 12 in a method step 28 (cf. FIG. 4). In an initialization step, the laser measuring module 12 and the display module 14 are mechanically coupled to one another, as a result of which a location of the display module 14 relative to a location of the laser measuring module 12 is determined. The location capture unit 24 of the display module 14 and the location capture unit 24 of the laser measuring module 12 are aligned with one another, that is to say a common reference system is determined, for example a reference system tied to a location of the laser measuring module 12. A coordinate system 70 of the display module 14 is adjusted to a coordinate system 72 of the laser measuring module 12. A relative location of the coordinate systems 70, 72 with respect to one another, an orientation of the coordinate systems 70, 72 with respect to one another and relative scaling factors in three spatial directions are determined. Alternatively, however, a reference system tied to a location of the display module 14 or a stationary reference system can also be determined as the common reference system.

In an operating mode, in particular in a subsequent method step 30, the display module 14 is moved independently of the laser measuring module 12 in space. The laser measuring module 12 is moved in space, a result of which a position of the measuring point 16 is changed. The communication apparatus regularly transmits the location data relating to the laser measuring module 12 in real time in a method step 74, in particular if the display module 14 moves and/or if the laser measuring module 12 moves. The location capture unit 24 of the display module 14 captures the location changes of the display module 14. The location capture unit 24 of the display module 14 captures the location data relating to the display module 14. The computing unit 26 tracks the location changes. The computing unit 26 evaluates the data received by the receiving unit 62 of the communication apparatus and compares them with the location data captured by the location capture unit 24, thus obtaining an item of information relating to a relative position and an orientation of the display module 14 with respect to the laser measuring module 12.

The laser measuring module 12 captures an emission direction of the laser measuring beam 44. The sensor unit 46 of the laser measuring module 12 captures reflections of the laser measuring beam 44 at a measuring object 48 and transmits received data to the control and regulating unit 50. The control and regulating unit 50 determines a distance between the laser measuring module 12 and the measuring point 16, that is to say the place at which the laser measuring beam 44 strikes the measuring object 48. The control and regulating unit 50 determines a position of the measuring point 16 based on the location of the laser measuring module 12 from the emission direction of the laser measuring beam 44 and from the distance of the measuring point 16. The communication apparatus transmits position data relating to the measuring point 16 based on the common reference system, for example based on the coordinate system 72 of the laser measuring module 12, to the display module 14. The communication apparatus regularly transmits the position data relating to the measuring point 16. The communication apparatus transmits the position data relating to the measuring point 16 in real time. The computing unit 26 evaluates the transmitted position data relating to the measuring point 16. The computing unit 26 converts the transmitted position data relating to the measuring point 16, the bearings of which have been taken, from the coordinate system 72 of the laser measuring module 12 to the coordinate system 70 of the display module 14 by means of a transformation rule. The position data are given, for example, as Cartesian coordinates as axis sections of three linearly independent coordinate axes. The position data are given, for example, as polar coordinates of a vector between the laser measuring module 12 and the measuring point 16, in particular as two angle values and a distance value corresponding to a length of the vector between the laser measuring module 12 and the measuring point 16. It is conceivable for the position data to be given as another data tuple which appears to be useful to a person skilled in the art. For example, the transformation rule comprises a set of instructions for converting between coordinate systems of an identical or different structure, for example between two Cartesian coordinate systems, between a Cartesian coordinate system and a polar coordinate system and/or between two polar coordinate systems. The computing unit 26 calculates coordinates for displaying the measuring point 16 by means of the display unit 52, based on the coordinate system 70 of the display module 14, on the basis of the location data relating to the laser measuring module 12 and on the basis of the location data relating to the display module 14. In a further method step 32, the computing unit 26 determines display coordinates of the measuring point 16, the bearings of which have been taken, for displaying the measuring point 16 from the location data relating to the laser measuring module 12 and from the location data relating to the display module 14. The computing unit 26 regularly determines the display coordinates. The computing unit 26 determines the display coordinates in real time.

In the present exemplary embodiment, the capture unit 64 of the laser measuring module 12 captures environmental data relating to the laser measuring module 12 in a field of view 76 (cf. FIG. 1). In a method step 78, the communication apparatus transmits the environmental data to the display module 14. The capture unit 22 of the display module 14 captures environmental data relating to the display module 14 in a field of view 68 which corresponds to the field of view 68 of the user in the present exemplary embodiment. The field of view 76 of the capture unit 64 of the laser measuring module 12 and the field of view 68 of the capture unit 22 of the display module 14 image overlapping regions of the environment. The computing unit 26 compares the environmental data relating to the laser measuring module 12 and the environmental data relating to the display module 14 with one another. The computing unit 26 comprises, for example, image evaluation routines and is provided for the purpose of identifying and/or locating elements of imaged objects such as surfaces and/or edges. It is conceivable for the computing unit 26 to comprise image recognition routines or the like and to be provided for the purpose of comparing images of objects with a set of comparison images, in particular comparison images stored in an abstracted manner, and/or to categorize said images. The computing unit 26 determines a correction for overlapping regions and applies this correction to the display coordinates of the measuring point 16, the bearings of which have been taken. The computing unit 26 compares, for example, images of objects contained in the field of view 76 of the capture unit 64 of the laser measuring module 12 with images of objects contained in the field of view 68 of the capture unit 22 of the display module 24 and/or assigns the images to one another. In an alternative configuration, it is possible to dispense with the capture and comparison of the environmental data. The computing unit 26 transmits the display coordinates to the display unit 52. The display unit 52 displays an image of the measuring point 16 according to the display coordinates in a positionally accurate manner in an image of the environment of the display module 14 which can be perceived by the user. In an operating mode, the computing unit 26 records an image sequence generated by the display unit 52. The computing unit 26 records a display of the measuring point 16. The computing unit 26 is provided for the purpose of reproducing a recorded display.

In an operating mode of the system 10, the computing unit 26 stores the display coordinates of the measuring point 16. In a method step 82, the bearings of at least one further measuring point 18 are taken by means of the laser measuring module 12. In a similar manner to the procedure for the stored measuring point 16, the control and regulating unit 50 of the laser measuring module 12 determines the position data relating to the further measuring point 18, the communication apparatus transmits the coordinates of the further measuring point 18 and the computing unit 26 of the display module 14 determines the display coordinates of the further measuring point 18 based on the coordinate system 70 of the display module 14. The display module 14 displays the further measuring point 16. The display unit 52 displays an image of the measuring point 18 together with the image of the stored measuring point 16 in the image of the environment which can be perceived by the user. In an optional method step 84, the display module 14 displays a line 34 between the measuring point 16 and the further measuring point 18. The line 34 makes a measuring section 80 clearly discernible to the user. On the basis of the further measuring point 18, the measuring section 80 can be determined by the user and a length of the measuring section 80 can be determined by means of the laser measuring module 12.

In an operating mode of the system 10, the bearings of a sequence of three measuring points 16, 18, 20 are taken by means of the laser measuring module 12 in a method step 86. For example, the bearings of a first measuring point 16, a further measuring point 18 and a third measuring point 20 are taken in succession by the user by means of the laser measuring module 12. The display module 14 displays each of the measuring points 16, 18, 20 in a manner discernible to the user during the operation of taking bearings. During the operation of taking bearings, the control and regulating unit 50 determines a distance between the measuring points 16, 18, 20 and the laser measuring module 12. It is conceivable for the user to take bearings of further measuring points and to determine their position for a measuring operation. The display module 14 displays the measuring points 16, 18, 20 for selection for a measuring operation. On the basis of the display, sections, figures and/or surfaces to be measured can be determined, for example in a selection by the user. It is conceivable for all or some of the measuring points 16, 18, 20 to be able to be included in a measuring operation for the purpose of determining a length of a traverse. The user can define a geometrical figure by means of all or some of the measuring points 16, 18, 20 for the purpose of determining geometrical variables, for example lengths, surface areas and/or volumes. In an operating mode of the system 10, the computing unit 26 connects selected measuring points 16, 18, 20 to lines 34, 36 and the display unit 52 displays the lines 34, 36 in the field of view 68 of the user. Sections determined for a measuring operation become discernible to the user.

In a subsequent method step 88 in particular, the computing unit 26 calculates a geometrical variable or a plurality of geometrical variables determined by the measuring points 16, 18, 20, for example a total length of a traverse determined by the measuring points 16, 18, 20, a surface or a plurality of surfaces of a figure determined by the measuring points 16, 18, 20 or a volume of a figure determined by the measuring points 16, 18, 20.

The method steps 28, 30, 74, 32, 78, 82, 84, 86, 88 in FIG. 4 can be repeatedly run through individually or else in combination in an advantageous exemplary embodiment, in particular also in the form of method blocks.

In particular, in a preferred exemplary embodiment, a method block which is carried out repeatedly may consist of the method steps 30, 74, 32 and optionally also 78, that is to say may consist of independent movement of the display module 14 and of the laser measuring module 12 in space, transmission of location data relating to the laser measuring module 12 by means of the communication apparatus and determination of display coordinates of the measuring point 16, the bearings of which have been taken, for displaying the measuring point 16 by means of the computing unit 26, and optionally transmission of environmental data to the display module 14.

Furthermore, in an exemplary embodiment, a method block, in particular a further method block, may consist, for example, of the method steps 82, 84, 86, 88, that is to say may consist of taking the bearings of a further measuring point 18, displaying a line between measuring points, the bearings of which have been taken, possibly taking the bearings of a third measuring point 16, 18, 20 and calculating a geometrical variable or a plurality of geometrical variables determined by measuring points 16, 18, 20.

It is pointed out that method steps may furthermore also be omitted or optionally carried out, in particular, for example, the method step 78 relating to the transmission of environmental data to the display module 14 and/or the method step 84 relating to the display of a line between measuring points 16, 18, 20, the bearings of which have been taken. Further possible combinations and/or sequences and/or flows, in particular possible combinations and/or sequences and/or flows which appear to be necessary or useful to a person skilled in the art, are conceivable.

The invention claimed is:

1. A system, comprising:
a laser measuring module configured to provide a length measurement; and
at least one display module configured to electronically display at least one measuring point associated with the length measurement and further configured to be separate from the laser measuring module, bearings of the at least one measuring point being taken using the laser measuring module,
wherein the bearings are transmitted to the at least one display module such that the display module electronically displays in real time the at least one measuring point only when a field of view of the display module overlaps a portion of a field of view of the laser measuring module that contains the at least one measuring point, and
wherein the at least one display module is configured to be fastened proximate to an eye of a user such that the field of view of the display module corresponds to a field of view of the user.

2. The system as claimed in claim 1, wherein the at least one display module includes at least one capture unit configured to capture environmental data.

3. The system as claimed in claim 1, wherein the at least one display module includes a location capture unit that captures location data relating to a position and an orientation of the at least one display module relative to the laser measuring module.

4. The system as claimed in claim 1, further comprising a computing unit disposed locally in at least one of the laser measuring module and the at least one display module, wherein the computing unit is configured to determine coordinates to electronically display the at least one measuring point via the display module at least from position data relating to the at least one measuring point, and wherein the bearings of the at least one measuring point are taken from location data relating to the at least one display module.

5. A display module included in a system having a laser measuring module that provides a length measurement, the display module comprising:
a display unit configured to electronically display at least one measuring point associated with the length measurement and further configured to be separate from the laser measuring module,
wherein bearings of the at least one measuring point are taken using the laser measuring module and are transmitted to the display unit such that the at least one measuring point is electronically displayed in real time on the display unit only when a field of view of the display unit overlaps a portion of a field of view of the laser measuring module that contains the at least one measuring point, and
wherein the display unit is configured to be fastened proximate to an eye of a user such that the field of view of the display unit corresponds to a field of view of the user.

6. A method for displaying a measuring point using a system including a laser measuring module and at least one display module, the method comprising:
fastening the at least one display module proximate to an eye of a user;
providing a length measurement using the laser measuring module;
taking bearings of at least one measuring point associated with the length measurement using the laser measuring module;
comparing location data relating to the at least one display module with location data relating to the laser measuring module; and
electronically displaying in real time the at least one measuring point using the at least one display module when a field of view of the display module overlaps a portion of a field of view of the laser measuring module that contains the at least one measuring point, the at least one display module configured to be separate from the laser measuring module, the field of view of the display module corresponding to a field of view of the user.

7. The method as claimed in claim 6, further comprising: moving the at least one display module independently of the laser measuring module in space; and
capturing the location data relating to the at least one display module using a location capture unit of the at least one display module.

8. The method as claimed in claim 6, further comprising: determining display coordinates of the at least one measuring point using a computing unit disposed locally in at least one of the laser measuring module and the at least one display module, the bearings of the at least one measuring point being taken for displaying the at least one measuring point via the display module at least from the location data relating to the laser measuring module and from the location data relating to the at least one display module.

9. The method as claimed in claim 6, further comprising: taking the bearings of at least one further measuring point using the laser measuring module; and
displaying the at least one further measuring point using the at least one display module.

10. The method as claimed in claim 9, further comprising: displaying a line using the at least one display module between the at least one measuring point and the at least one further measuring point.

11. The method as claimed in claim 7, further comprising: taking bearings of a sequence of at least three measuring points using the laser measuring module; and
displaying the at least three measuring points using the at least one display module for selection for a measuring operation.

12. The method as claimed in claim 11, further comprising:
calculating at least one geometrical variable determined by the at least one measuring point using a computing unit of the system.

13. The system as claimed in claim 1, wherein the at least one display module is further configured to be removable from the laser measuring module.

14. The method as claimed in claim 6, wherein the at least one display module is configured to be removable from the laser measuring module.

15. The system as claimed in claim 1, further comprising at least one communication apparatus configured to transmit position data relating to the at least one measuring point from the laser measuring module to the at least one display module.

16. The system as claimed in claim 1, wherein the at least one display module moves relative to the laser measuring module without a fixed mechanical connection to the laser measuring module.

17. The system as claimed in claim 3, wherein the location data is captured continuously in real time such that the electronic display of the at least one measuring point by the at least one display module changes simultaneously with a change in the location data.

18. The display module as claimed in claim 5, further comprising a housing to which the display unit is mounted, the housing configured to be spatially displaced and rotated independently of the laser measuring module.

19. The method as claimed in claim 7, wherein moving the at least one display module includes moving a first housing of the at least one display module independently of a second housing of the laser measuring module in space.

* * * * *